(12) United States Patent
Herlin-Boime et al.

(10) Patent No.: US 8,337,673 B2
(45) Date of Patent: Dec. 25, 2012

(54) SYNTHESIS OF SILICON NANOCRYSTALS BY LASER PYROLYSIS

(75) Inventors: Nathalie Herlin-Boime, Orsay (FR); Olivier Sublemontier, Fontenay Aux Roses (FR); Frédéric Lacour, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 312 days.

(21) Appl. No.: 12/600,611

(22) PCT Filed: May 15, 2008

(86) PCT No.: PCT/FR2008/050838
§ 371 (c)(1),
(2), (4) Date: Nov. 17, 2009

(87) PCT Pub. No.: WO2008/152272
PCT Pub. Date: Dec. 18, 2008

(65) Prior Publication Data
US 2010/0147675 A1     Jun. 17, 2010

(30) Foreign Application Priority Data
May 18, 2007   (FR) ..................................... 07 03563

(51) Int. Cl.
*B01J 19/12*  (2006.01)
*C01B 33/027* (2006.01)
(52) U.S. Cl. ............. 204/157.41; 204/157.45; 977/899; 977/901
(58) Field of Classification Search ............. 204/157.41, 204/157.45; 977/899, 901
See application file for complete search history.

(56) References Cited

U.S. PATENT DOCUMENTS
2,985,573 A * 5/1961 Cherrier et al. ............... 204/164
(Continued)

FOREIGN PATENT DOCUMENTS
FR          2912070 A1 *  8/2008
(Continued)

OTHER PUBLICATIONS

Ehbrecht et al, "Laser-driven flow reactor as a cluster beam source," Rev. Sci. Instrum. 66, No. 7, pp. 3833-3837 (Jul. 1995).*

(Continued)

*Primary Examiner* — Keith Hendricks
*Assistant Examiner* — Colleen M Raphael
(74) *Attorney, Agent, or Firm* — Miller, Matthias & Hull LLP (57) ABSTRACT

The invention relates to the synthesis of silicon-containing nanoparticles by laser pyrolysis. For this purpose: a precursor ($SiH_4$) containing the element silicon is conveyed, by a transport fluid (He), into a pyrolysis reactor (REAC); laser radiation (LAS) is applied, in the reactor, to a mixture that the transport fluid and the precursor form; and silicon-containing nanoparticles (nP) are recovered at the exit of the reactor. In particular, the power of the laser radiation is controlled. Furthermore, the effective pulse duration is controlled within a laser firing period. Typically, for a power greater than 500 watts and a pulse duration greater than 40% of a laser firing period, nanoparticles having a crystalline structure with a size of less than or of the order of one nanometer are obtained at a rate greater than or of the order of 80 milligrams per hour. Under optimum conditions, a record rate of greater than 740 milligrams per hour was able to be obtained.

12 Claims, 5 Drawing Sheets

U.S. PATENT DOCUMENTS

| | | | | |
|---|---|---|---|---|
| 3,733,387 | A | * | 5/1973 | Kugler et al. ................ 204/164 |
| 5,425,922 | A | * | 6/1995 | Kawaguchi ............. 204/157.41 |
| 5,562,771 | A | | 10/1996 | Kawaguchi |
| 5,958,348 | A | * | 9/1999 | Bi et al. ................... 422/186.04 |
| 6,106,798 | A | * | 8/2000 | Kambe et al. ............ 423/594.17 |
| 6,193,936 | B1 | * | 2/2001 | Gardner et al. ............... 422/186 |
| 6,270,732 | B1 | * | 8/2001 | Gardner et al. ......... 422/186.04 |
| 6,471,930 | B2 | * | 10/2002 | Kambe et al. ................. 423/335 |
| 6,726,990 | B1 | * | 4/2004 | Kumar et al. ................. 428/402 |
| 6,849,334 | B2 | * | 2/2005 | Horne et al. ................. 428/402 |
| 6,977,097 | B2 | * | 12/2005 | Doan ....................... 204/157.41 |
| 2003/0034243 | A1 | * | 2/2003 | Yokoyama et al. ........ 204/157.2 |
| 2003/0203205 | A1 | * | 10/2003 | Bi et al. ........................ 428/402 |
| 2004/0229447 | A1 | | 11/2004 | Swihart |
| 2006/0049547 | A1 | * | 3/2006 | Khang .......................... 264/400 |
| 2006/0137487 | A1 | * | 6/2006 | McKinnon et al. ........... 977/842 |
| 2006/0218971 | A1 | * | 10/2006 | Martin et al. ................. 65/17.4 |

FOREIGN PATENT DOCUMENTS

| | | |
|---|---|---|
| JP | 05 200266 | 10/1993 |
| WO | WO 2006/051233 A | 5/2006 |

OTHER PUBLICATIONS

Haggerty, "Sinterable Powders from Laser Driven Reactions: Final Report," MIT Energy Laboratory Report No. MIT-EL 82-002, Jul. 1977-Sep. 1981.*

Cannon et al, "Sinterable Ceramic Powders from Laser-Driven Reactions: I, Process Description and Modeling," J. Am. Ceram. Soc. vol. 65, No. 7, pp. 324-330, Jul. 1982.*

Cannon et al, Sinterable Ceramic Powders from Laser-Driven Reactions: II, Powder Characteristics and Process Variables, J. Am. Ceram. Soc. vol. 65, No. 7, pp. 330-335, Jul. 1982.*

Borsella et al, "Composite Si/C/N powder production by laser induced gas phase reactions," J. Mater. Res. vol. 7, No. 8, Aug. 1992, pp. 2257-2268.*

Kanemitsu et al, Visible photoluminescence from oxidized Si nanometer-sized spheres: Exciton confinement on a spherical shell,: Phys. Rev. B vol. 48, No. 7, Aug. 15, 1993, pp. 4883-4887.*

Cauchetier et al, "Laser synthesis of ultrafine powders," Ceramics International (abstract only), vol. 13, issue 1, 1987.*

Fojtik et al, "Formation of Nanometer-Size Silicon Particles in a Laser Induced Plasma in SiH4," Berichte der Bunsengesellschaft fuer physikalische Chemie, vol. 97, issue 11, pp. 1493-1496, Nov. 1993.*

Ehbrecht and Huisken, "Gas-phase characterization of silicon nanoclusters produced by laser pyrolysis of silane," Phys. Rev. B, vol. 59, No. 4, Jan. 15, 1999, pp. 2975-2985.*

Huisken et al, "Nanostructuration with visible-light-emitting silicon nanocrystals," New Journal of Physics 5, (2003), pp. 10.1-10.10.*

Trave et al, "Towards controllable optical properties of silicon based nanoparticles for applications in opto-electronics," Optical Materials 27 (2005) pp. 1014-1019.*

Alexandrescu et al, "Structural and magnetic properties of nanosized iron-polyoxocarbon silane core-shell composites prepared by laser pyrolysis," Advanced Laser Technologies 2006, ed. Dumitras et al, Proc. of SPIE col. 6606, 66060K, pp. 66060K-1-66060K-8.*

Pola et al, "IR laser-induced thermolysis of (chloromethyl)silane: complex reaction involving H2Si:, H2C: and HClSi: transients and yielding nanostructured Si/C/H phases," J. of Materials Chemistry 2002, vol. 12, pp. 1519-1524.*

Huisken et al, "Silicon carbide nanoparticles produced by CO2 laser pyrolysis of SiH4/C2H2 gas mixtures in a flow reactor," J. of Nanoparticle Research vol. 1, pp. 292-303, 1999.*

L. Mangolini, et al. "High yield plasma synthesis of luminescent silicon nanocrystals", vol. 5-4, p. 655-659 (2005).

G Ledoux, et al. "Photoluminescense properties of silicon nanosrystals as a function of their size", vol. 62(23) p. 15942-51 (2000).

X Li, et al. "Process for Preparing Macroscopic Quantities of Brightly Photoluminescent Silicon Nanaoparticles with Emission Spanning the Visible Spectrum", Langmuir, p. 8490-8496 (2003).

N. Herlin-Boime, et al. "Laser-grown silicon nanoparticles and photoluminescence properties", Proceedings MRS spring meeting, symposium M, San-Francisco, USA (2004.

International Search Report issued in related PCT application No. PCT/FR2008/050838; report dated Dec. 17, 2008.

* cited by examiner

SYNTHESIS OF SILICON NANOCRYSTALS BY LASER PYROLYSIS

CROSS-REFERENCE TO RELATED APPLICATIONS

This application is a U.S. national stage filing of International Patent Application No. PCT/FR2008/050838 filed on May 15, 2008, which claims priority under the Paris Convention to the French Patent Application No. 07 03563, filed on May 18, 2007.

TECHNICAL FIELD

The present invention relates to the synthesis of silicon-containing nanoparticles of crystalline form.

BACKGROUND OF THE DISCLOSURE

Figure 1:
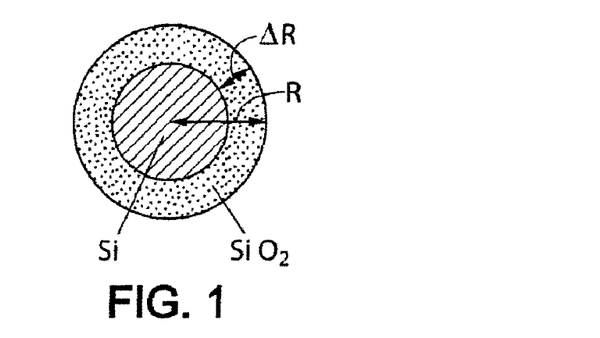
FIG. 1 is a schematic representation of a crystalline silicone nanoparticle.

Referring to FIG. 1, a crystalline silicon nanoparticle Si naturally includes, on the surface, a layer of oxide $SiO_2$, the thickness $\Delta R$ of which is about one tenth of the overall diameter D of the nanoparticle. By quantum confinement, such nanoparticles, having a crystalline silicon core of the order of 10 nanometers or less in size, exhibit photoluminescence properties. The emission wavelength of the photons through the photoluminescence effect is shorter the smaller the size of the crystalline core of the nanoparticles (from 10 nm for emission in the red/infrared to 3 nm for emission in the red/yellow). Moreover, it is also possible to modify the emission wavelengths, especially by modifying the composition of the nanoparticles. For example, it is pointed out that carbon-containing (Si—C) nanoparticles and/or germanium-containing (Si—Ge) nanoparticles and/or nitrogen-containing (Si—N) nanoparticles may also have photoluminescence properties.

Thus, silicon, in the form of a powder of crystalline nanograins, is photoluminescent. This property, observable at room temperature and in the visible range (from green to red, depending on the grain size), may open the way for applications in very diverse fields, such as photonics (silicon lasers), biology (labels or tracers), counterfeit detection (optical barcode) cosmetics, etc.

The photoluminescence ascribed to the phenomenon of quantum confinement is observed when the structuring of the silicon is reduced to a nanoscale (size less than 10 nm) and the observed color varies according to the size of the nanocrystals. It will therefore be understood that there is a growing interest in producing silicon nanocrystals of as small a size as possible. However, the development of devices based on such nanoparticles has been retarded by the lack of availability of said nanoparticles.

Several approaches have been developed for obtaining these materials. Several techniques may for example be mentioned which result in thin Si-containing films, such as the implantation of Si into an $SiO_2$ matrix followed by annealing, which has the effect of precipitating silicon nanocrystals. PECVD (plasma-enhanced chemical vapor deposition) may also be mentioned. Furthermore, approaches in liquid phase, such as what is called "reverse micelle" synthesis, or else supercritical solutions, are often lengthy to implement and give low yields.

As regards physical synthesis processes for obtaining free nanoparticles, the following may be mentioned: laser ablation; thermal pyrolysis in a fluidized reactor, plasma-induced synthesis; and laser-induced pyrolysis (using a sufficiently powerful laser such as for example a $CO_2$ laser). Only the latter two techniques have given useful results as regards production and quality of the nanoparticles obtained.

According to a first technique, silicon nanoparticles in the size range from 2 to 8 nm have been obtained in a low-pressure (186 to 1860 Pa) argon/silane radiofrequency plasma by the process described in: "*High yield plasma synthesis of luminescent silicon nanocrystals*" by L. Mangolini, E. Thimsen and U. Korsthagen, Nanoletters, Vol. 5-4, pp. 655-659, (2005). Silane flow rates in the 0.4 to 2.4 sccm (standard cubic centimeters per minute) range allow production rates ranging from 14 to 52 mg per hour to be achieved.

The nanoparticles have quite a narrow size distribution (for example 5.72 nm with a standard deviation of 0.68 nm). After what is called a "passivation" treatment aimed at making the surface of the nanoparticles inert, they exhibit photoluminescence with a peak wavelength between 700 and 840 nm, depending on the nanoparticles.

A second technique is the laser pyrolysis of silane, especially using a $CO_2$-based pulsed laser, according to the process described in: "*Photoluminescence properties of silicon nanocrystals as a function of their size*" by G. Ledoux, O. Guillois, D. Porterat, C. Reynaud, F. Huisken, B. Kohn and V. Paillard, Phys. Rev. B, Vol. 62(23), pp. 15942-51 (2000). It will be recalled that this technique consists in exposing a stream of silane to a laser beam so as to raise its temperature up to the point of obtaining a pyrolysis flame and to collect silicon nanoparticles that are formed in the flame. The nanoparticles obtained lie within a size range between 2.8 and 4.8 nm and emit intense photoluminescence in the 610-900 nm wavelength range after simple passivation in air. However, the very small quantities obtained (only a few milligrams) seem incompatible with industrial applications.

More recently, it has been shown that it is possible to produce silicon nanoparticles in the 5-20 nm size range by laser pyrolysis of silane at a pressure of $54 \times 10^3$ Pa, using a continuous, but focused, low-power (60 W) laser (with a focal spot diameter of 2 mm), in the document: "*Process for Preparing Macroscopic Quantities of Brightly Photoluminescent Silicon Nanoparticles with Emission Spanning the Visible Spectrum*" by X. Li, Y. He, S. Talukdar, M. Swihart, Langmuir 19, pp. 8490-8496 (2003). The production rate is in the 20-200 mg/hour range. However, after the synthesis, a second step (here a chemical treatment by an $HF/HNO_3$ compound) is necessary to make the particles photoluminescent. The photoluminescence can then be observed in the 500-800 nm wavelength range.

In that same document it is indicated that production rates would be higher using a higher-power laser and by increasing the size of the laser/precursor overlap area. However, no details are given about the effect of these parameters on the particle sizes. Nevertheless, an increase in crystal size is expected since an increase in the laser power would a priori lead to an increase in the flame temperature and therefore, in general, to better crystallization. Furthermore, increasing the overlap area would itself also lead to an increase in the interaction time and therefore in the size of the crystals obtained.

Silicon nanoparticles with a size possibly down to around 12 nm have been obtained by laser pyrolysis, using a high-power continuous laser, as described in: "*Laser-grown silicon nanoparticles and photoluminescence properties*" by N. Herlin-Boime, K. Jursikova, E. Trave, E. Borsella, O. Guillois, J. Vicens and C. Reynaud, Proceedings, MRS Spring Meeting, Symposium M, San Francisco, USA (2004). The production rates obtained are several grams per hour. Because of their size, these nanoparticles do not exhibit photoluminescence. Only by a heat treatment step in air (so as to force oxidation)

could the size of the silicon core be reduced to below 10 nm and therefore the photoluminescence effect obtained.

Thus, as regards laser pyrolysis, there is presently no solution making it possible to obtain, in weighable amount and in a single step, silicon nanoparticles having a size of 10 nm or less and exhibiting photoluminescence properties, for example after simple passivation in air.

The aim of the present invention is to improve the situation.

SUMMARY OF THE DISCLOSURE

The invention proposes for this purpose a method for the synthesis of silicon-containing nanoparticles by laser pyrolysis, the process comprising the steps of:
- conveying, by a carrier fluid, a precursor containing the element silicon to a pyrolysis reactor;
- applying laser radiation to the mixture that the carrier fluid and the precursor form in the reactor; and
- recovering silicon-containing nanoparticles at the outlet of the reactor.

According to the invention, the laser radiation is controlled, at least in terms of its power. The laser radiation may also be controlled in terms of its effective pulse duration within a laser firing period. Advantageously:
- for a power typically of about 500 watts or higher and
- for a pulse duration of about 40% of a laser firing period or longer, nanoparticles having a crystalline core with a size of around 10 nanometers or less are obtained with a production rate of around 80 milligrams per hour or more.

From the trials carried out, it has been observed in fact that one important parameter for obtaining a weighable amount of photoluminescent nanoparticles is the level of photon energy delivered to the pyrolysis reaction, this being even more important than the amount of precursor or its rate of transit through the pyrolysis reactor. For example, despite an increase in the rate of transit of the precursor through the pyrolysis reactor (and therefore a reduction in the time allowed for the pyrolysis reaction), it has been observed that the production rate could nevertheless increase, in particular depending on the energy delivered by the laser radiation either in terms of laser power or in terms of effective emitted pulse duration.

The present invention proposes for the first time a substantial increase in the production rate while finely controlling the size of the nanoparticles obtained, in particular by varying the laser power and the percentage effective pulse duration, thereby making it possible, as will be seen in the exemplary embodiments given later, to achieve record production rates in excess of 700 milligrams per hour whilst obtaining nanoparticles with sizes that nevertheless remain below 10 nm.

Another parameter which is advantageous to control is the dilution of the precursor containing the element silicon in the carrier fluid. Indeed it is necessary to control the number of collisions between silicon atoms so as to limit the size of the nanoparticles. Furthermore, but with a lesser influence, the fact of diluting the precursor makes it possible to increase the carrier stream flow rate and, therefore, the rate of transit through the reactor. Thus, the reaction time is limited and, as a consequence, so is the particle growth.

From the trials carried out, the fact of increasing the delivery of photon energy (power and effective pulse duration) makes it possible to increase the production rate. However, the increase in production rate is very often accompanied by an increase in the size of the particles obtained. Dilution therefore can be an additional parameter for limiting the increase in size of the particles and by controlling the three parameters—laser power, percentage effective pulse duration and dilution—it is possible for the size of the particles obtained to be finely controlled while still producing them in weighable amounts. Typically, for a precursor containing one silicon atom per molecule, a dilution of between 1/10 and 1/30 in the carrier fluid has provided good results with a laser power of greater than 500 W and a percentage effective pulse duration of 40%. Of course, the carrier fluid is preferably an inert gas, such as for example helium. The precursor may also be conveyed in gas form into the reactor. Typically, the precursor may be silane of formula $SiH_4$.

Preferably, the laser radiation is focused in the reactor, for example with a focal spot 2 mm in diameter. It is advantageous also to control the focusing of the laser beam in the reactor in order to ensure that the laser power setpoint (i.e. the power which it is desirable to impose) is effectively transmitted into the reactor and, with lesser influence according to the trials carried out, to create a small geometric laser/precursor interaction zone and thus to ensure that the particle growth time in the reaction zone is limited.

Moreover, another means of limiting the laser/precursor interaction time may simply be, as indicated above, to control the carrier fluid flow rate in order for the rate of injection into the reactor to be within the 4 to 11 meters per second range given above. The rate of injection makes it possible for the rate of transit through the reaction zone to be controlled indirectly. To simplify the explanation below, these two rates will be collectively referred to by the same term "rate of transit".

Another parameter that may be advantageous to control is the pressure of the mixture that the precursor and the carrier fluid form in the reactor. Preferably, this pressure is low (below atmospheric pressure), this having the effect of limiting the nucleation and the collisions resulting in the growth of the particles. In the exemplary embodiment in which the precursor is a gas such as silane carried in an inert gas (for example helium), the pressure in the reactor is preferably between about 40 torr and about 300 torr and advantageously between 150 and 300 torr. However, it is not excluded, in an alternative embodiment, for the precursor to be conveyed into the reactor in a form other than a gas (for example in the form of droplets), and in this case the pressure at least of the carrier fluid is then controlled, the carrier fluid itself preferably remaining in gaseous form.

Advantageously, a cold quench is also applied to the particles as they leave the reactor so as to stop the growth of the particles after the pyrolysis reaction.

BRIEF DESCRIPTION OF THE DRAWINGS

Other features and advantages of the invention will become apparent on examining the detailed description below and the appended drawings in which.

DETAILED DESCRIPTION OF THE DISCLOSURE

Figure 2:
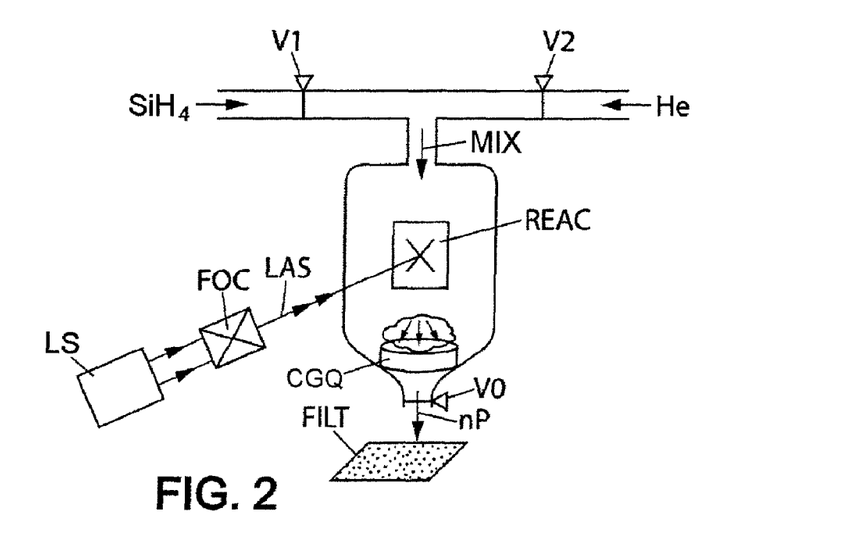
FIG. 2 illustrates schematically a device for implementing the pyrolysis method according to the invention.

Referring to FIG. 2, a precursor containing the element silicon, in gaseous form, and more precisely silane $SiH_4$ in the exemplary embodiment described, is mixed with an inert gas, here helium He, as carry fluid. Preferably, the dilution of the precursor in the carrier fluid is between 1/10 and 1/30. In the embodiment described, the dilution is controlled by the two valves V1 and V2 in FIG. 2. The mixture of the two gases, with the reference MIX in FIG. 2, is conveyed into a reaction chamber REAC at a pressure controlled by a pressure gauge V0. The pressure of the mixture is preferably between 150 and 300 torr. A mass flow rate regulator system, comprising the valves V1 and in particular V2, is used for also controlling the gas flow rate and in particular the carrier stream (arrow He) in the reaction chamber REAC. The carrier fluid flow rate here is between 600 and 2000 sccm, which corresponds, under the experimental conditions of the trials carried out and described below, to a rate of transit in the reactor REAC of between about 4 and 11 meters per second.

Figure 3:
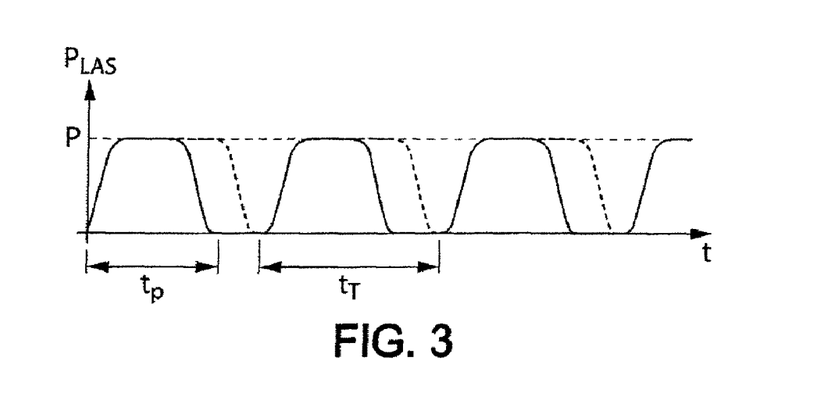
FIG. 3 illustrates the effective pulse durations during laser firings with a constant frequency.

According to the invention, it is chosen to use a laser source LS that can operate at high power in continuous mode or in pulsed mode, with therefore pulse durations much longer than those recommended in the prior art (with a percentage effective pulse duration per laser firing period of around 40% or higher). This may for example be a $CO_2$ laser source that can deliver up to 5 kW in continuous mode. FIG. 3 shows schematically the waveform of the effective pulses of the laser firings. These firings are periodic. The total duration of a firing (or "firing period") is referenced $t_T$, whereas the duration of the effective pulses is referenced $t_p$. The laser power setpoint $P_{LAS}$ is reached at each effective pulse maximum P. The laser source LS of the pyrolysis device according to the invention can therefore be adjusted both in terms of power setpoint and firing period (or, equivalently, laser firing frequency), and also in terms of the percentage effective pulse duration $t_p$ per firing period $t_T$. Focusing means FOC are also provided, for focusing the beam emitted by the laser source LS so as to focus the laser beam LAS incident on the reactor REAC so that the impact of the beam LAS thus focused onto the pyrolysis reaction zone forms a spot about 2 millimeters in size. This corresponds to a reaction time of between about 0.18 and 0.5 milliseconds (for a rate of transit through the reactor of between 4 and 11 meters per second).

The synthesis process can be further improved by treating the particles obtained immediately on leaving the pyrolysis flame by a quenching effect. To do this, a cold gas CGQ is injected after the precursor/laser interaction zone so as to stop the growth of the particles. Thus, for the same particle size, it is possible to increase the production rate by carrying out this cold quench. This quenching system CGQ has an annular geometry similar to the quenching systems that may be used on plasma torches, but, to the knowledge of the inventors, such a system has never yet been used in a laser pyrolysis device.

The nanoparticles nP obtained are finally collected on a filter FILT. They generally have quite uniform sizes. Depending on the experimental conditions, the size may be between about 4 and 10 nanometers. The particles obtained become photoluminescent after natural oxidation in the atmosphere (typically after a few months, or even less in the case of small particles).

It should be pointed out at this stage that the production rate and the size of the particles obtained vary in the same direction and almost inseparably. In other words, if it is desired to increase the production rate, particles with a size that may exceed 10 nanometers are necessarily obtained. This therefore requires a chemical or heat treatment to make the particles photoluminescent.

Thus, using laser synthesis in continuous emission mode but at low power according to the prior art, the particles obtained have a large size and an additional chemical treatment step is necessary for obtaining photoluminescence. With a pulsed laser, the amounts produced are, on the other hand, extremely small.

More precisely, with a continuous laser, the reaction time depends only on the rate of transit of the reactants (therefore on their flow rate) and on the size of the laser spot.

The gas/laser interaction time may typically be around 0.1 to 1 ms in the prior art, in particular in the following document mentioned earlier: "*Laser-grown silicon nanoparticles and photoluminescence properties*" by N. Herlin-Boime, K. Jursikova, E. Trave, E. Borsella, O. Guillois, J. Vincens and C. Reynaud, Proceedings, MRS Spring Meeting, Symposium M, San Francisco, USA (2004).

Figure 4:
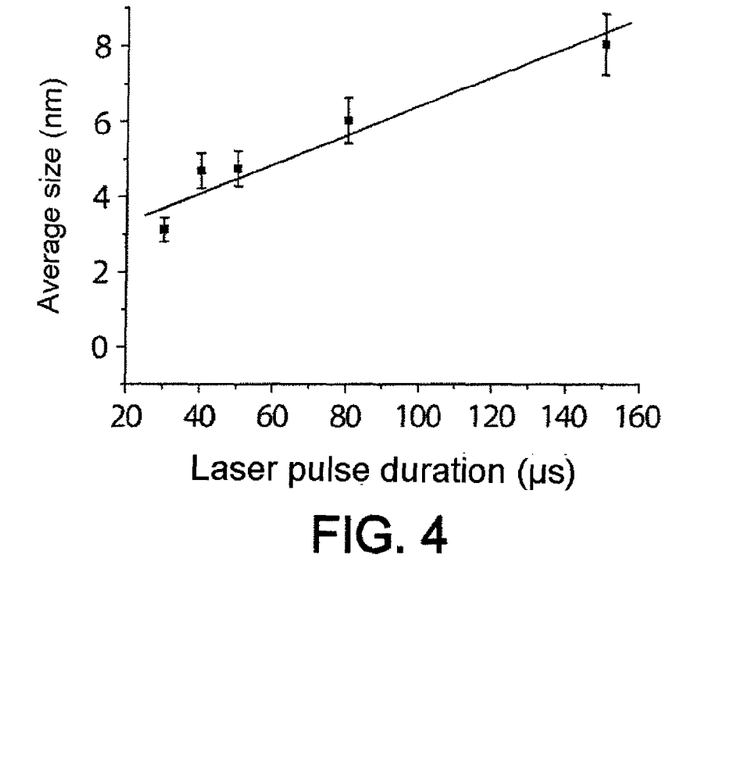
FIG. 4 illustrates the effect of the effective pulse duration on the size of the nanoparticles.

With a pulsed laser, the reaction time also depends on the duration of an effective laser pulse (as shown in FIG. 4 described above) and the fact of controlling, according to the invention, this parameter also makes it possible for the size of the particles obtained to be better controlled, while still producing them in weighable amounts.

FIG. 4 shows a variation in the size of the particles obtained as a function of the duration of the effective emitted pulses, the other parameters such as the percentage effective pulse duration per firing period, the laser power, the dilution, the pressure, etc., being constant. The size measurements were made in situ by time-of-flight mass spectrometry on nanoparticles extracted from the flame by differential pumping and a supersonic jet.

It appears that, already for only an effective pulse duration of 30 microseconds, nanoparticles are created. It should be noted that for shorter durations the pyrolysis flame could not at all be created. Within the stated range, it is observed in particular that the size of the nanoparticles and therefore the production rate clearly increase with the effective pulse duration, thereby confirming the importance of the effective pulse duration.

A range of effective pulse durations that has given good results is from about 30 microseconds to about 260 microseconds. Laser operation in continuous mode has also given good results, but at lower power.

Moreover, intuitively, the interaction time (through the pulse duration) and the reaction temperature (through the power or energy of the laser beam per unit area) are parameters of the type which promote crystal growth. However, the size of the crystals obtained remains below around 10 nanometers and it is, however, the nanoparticle production rate which is greatly increased, possibly reaching record values exceeding 700 milligrams per hour. Such results have been obtained in particular by controlling the percentage effective pulse duration per firing period.

However, experimental parameters other than the laser power or the effective pulse duration also have an influence, in particular the dilution of the precursor and to a lesser extent the pressure of the mixture and the rate of transit through the reactor. Several sets of parameters have been determined for obtaining significant amounts of nanoparticles, while still remaining within the size range of less than 10 nm. The table below shows the example of synthesizing four different batches having produced nanoparticles with production rates ranging from 80 to 740 mg/hour for sizes ranging from 4 to 9 nm.

| Powder | % effective pulse | Firing period (µs) | Power (W) | SiH$_4$ (sccm) | He (sccm) | Residence time (ms) | Production rate (g/h) | Size (nm) |
|---|---|---|---|---|---|---|---|---|
| A | 43.75 | 160.00 | 800.00 | 50.00 | 1062.50 | 0.34 | 0.08 | 4.00 |
| B | 50.00 | 60.00 | 930.00 | 50.00 | 1062.50 | 0.34 | 0.08 | 5.00 |
| C | 62.50 | 160.00 | 1230.00 | 50.00 | 1250.00 | 0.29 | 0.27 | 7.61 |
| D | 75.00 | 160.00 | 1500.00 | 50.00 | 687.50 | 0.51 | 0.74 | 9.58 |

Figure 5:
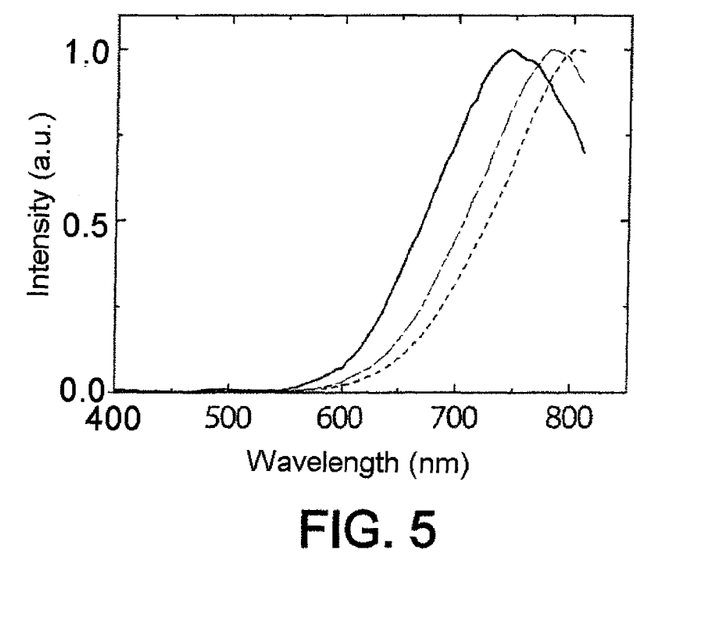
FIG. 5 shows the photoluminescence spectra recorded on nanoparticles obtained by implementing the process, for illustrating a small size distribution of these nanoparticles.

FIG. 5 shows the recorded photoluminescence spectra under ultraviolet laser irradiation on a powder obtained by implementing the process. The maximum (photoluminescence peak) is shifted between 740 and 800 nm, which corresponds to sizes ranging from 4.2 to 5.2 nm deduced from a calculation based on the theory of quantum confinement. This thus illustrates the small size distribution of the nanoparticles produced here. It should be noted that the particle size was also measured by high-resolution transmission electron microscopy and by the BET (Brunauer, Emmet and Teller) method and the particle size values were confirmed.

Apart from the effective pulse duration range given above, from 30 to 260 microseconds:
the laser power range goes from about 500 watts to about 2400 watts, advantageously from 500 watts to about 2000 watts;
the percentage effective pulse duration per laser firing is advantageously in the 40 to 100% range;
the dilution of the precursor in the carrier fluid is preferably in the 1/30 to 1/10 range;
the pressure of the mixture in the reactor is preferably in the 150 to 300 torr range; and
the residence time in the reactor is preferably in the range from 0.18 milliseconds (i.e. a rate of transit of 11 m/s through the reactor for a laser impact spot of 2 millimeters in size) to 0.5 milliseconds (for a rate of transit of 4 m/s).

For all these ranges of values, values close to the low limits (30 µs, 500 W, 40%, 1/30, 150 torr and 0.18 ms) promote particles with a small size. In contrast, values close to the high limits (260 µs, 2000 W, 100%, 1/10, 300 torr and 0.5 ms) promote particle growth and more particularly contribute to increasing the production rate. However, it should be pointed out that if the parameters are chosen to be only or mainly close to the low limits, simply no reaction flame is created and therefore no particles are produced. In contrast, if all the parameters are chosen to be close to the high limits, nanoparticles much larger in size than 10 nm are produced. Thus, production of nanoparticles with a size of less than 10 nm is the result of a compromise between the various synthesis parameters. Typically, the same particle size may be obtained with several different sets of experimental parameters.

The criteria for obtaining nanoparticles with a size of less than 10 nm and in a weighable amount are nevertheless specified below.

By choosing a dilution of less than 1/20 (and therefore in the 1/30-1/20 range) and a relatively low laser power (500-700 W), the percentage effective pulse duration is preferably 100% (laser operation in continuous mode) and preferably the pressure in the reactor is relatively high (250-300 torr).

By choosing a dilution of less than 1/20 but a moderate laser power (around 800 to 1000 W), the percentage effective pulse duration is preferably around 40 to 55% and the pressure instead is around 150-250 torr. Thus, to obtain particles with a diameter of about 5 nm (red) with an hourly production rate of around 100 milligrams per hour, it is possible to set the pulse duration at 40-45%, the pressure at 150 torr and the laser power at 800-900 W.

By choosing a dilution of less than 1/20 and a high laser power (above 1000 W), the percentage effective pulse duration is preferably around 60-75%, the power and the effective pulse duration therefore being increased. The pressure in the reactor is thus reduced to the 150 to 200 torr range. Thus, to obtain particles with a diameter of about 5 nm (red) with an hourly production rate of 150 mg/h, it is possible to set the pulse duration at 65%, the pressure at 150 torr and the laser power at 1500 W.

By choosing a dilution equal to or greater than 1/20 (closer to 1/10), the percentage effective pulse duration is preferably around 75% but with a high laser power (up to around 1500 W), while remaining within a low pressure range (150-200 torr).

Figure 6:
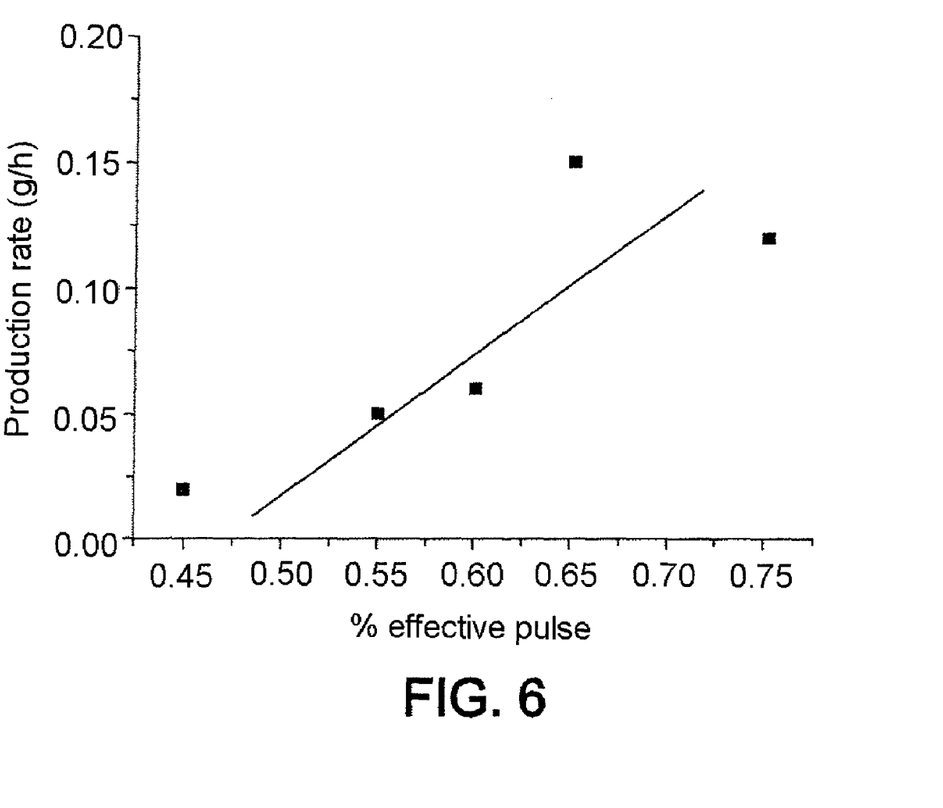
FIG. 6 illustrates the variation in hourly production rate of nanoparticles as a function of the percentage effective pulse duration per laser firing.

However, to illustrate the certain influence of the percentage effective pulse duration on the production rate, FIG. 6 shows a variation in the production rate as a function of this percentage, the other experimental parameters being substantially constant (or at least within the same ranges of values). This figure clearly shows the general trend in increasing the hourly production rate (here up to about 200 milligrams per hour) as a function of the percentage effective pulse duration.

Another object of the present invention is to provide a laser pyrolysis facility for the synthesis of silicon nanoparticles by the process according to the invention, said facility comprising in particular:
a laser source that can be adjusted at least in terms of its power and its effective pulse duration;
a system for regulating the mass flow rate, comprising a set of valves and a pressure gauge for controlling the dilution of precursor in the carrier fluid and/or the pressure in the reactor and/or the rate of transit through the reactor (via the carrier fluid flow rate);
focusing means FOC, for focusing the laser radiation so as to produce an interaction zone (focal spot) in the reactor REAC of about 2 millimeters in diameter;
a quenching system, by injecting a cold gas downstream of the pyrolysis zone.

In embodiments of the invention, the production rate of silicon nanocrystals is controlled by the power of the laser source. To have a maximum production rate, a laser with the highest possible power will preferably be used. Advantageously, this control by means of the power is carried out while optimizing the geometry of the laser beam so as to increase the production rate.

Advantageously, this laser power control is accompanied by an adjustment to the flow rate of the mixture entering the reaction chamber. This is because, apart from the influence on the production rate of nanocrystals, the laser power has an effect on the size of the particles obtained. The higher the laser power to which the precursor is exposed, the larger the size of the nanocrystals.

Thus, to obtain a high production rate for a given size of nanocrystals, for example around 200 mg/h for 4 nm particles, a high laser power and also a high flow rate of the mixture entering the reaction chamber are selected. In this way, even if the power is high, if the precursor spends a limited time in the interaction zone the nanocrystals do not have time to grow too much in size.

It will therefore be understood that the laser power and the flow rate of the mixture entering the reaction chamber are parameters for controlling the size of the nanocrystals. The size of the nanocrystals increases with the power of the laser source and decreases with the flow rate of the mixture entering the reaction chamber.

Another means of controlling the size of the nanocrystals consists in varying the dilution of the silane in the mixture introduced into the reaction chamber. This is because a low dilution of silane particles promotes collisions, and therefore nanocrystal growth. Thus, this dilution parameter must be taken into account in the production of nanocrystals. An optimum silane dilution range, for example in a mixture with helium, is around 5% to 8%. These percentages are based on the volume flow rates of silane and helium respectively. Within this range, it is possible to obtain quite fine particles. To control the dilution, aperture valves and mass flowmeters may be employed.

By modifying the dilution, for example by decreasing the amount of silane introduced without modifying the amount of helium introduced, the flow rate of the mixture entering the reaction chamber may consequently be modified. This modification of the dilution may therefore have an effect on the size of the particles. However, it may also have an effect on the size distribution of the nanocrystals.

Specifically, the gas mixture is introduced into the reaction chamber by means of a nozzle, said nozzle being surrounded by concentric circular injection means for injecting a confinement gas around the gas mixture.

This confinement gas, generally argon, has several functions. Firstly, it allows the flow of the mixture to be directed into the reaction chamber, for example thus avoiding any precursor/wall interaction. Secondly, the confinement gas makes it possible for the rates of transit of the precursor particles through the reaction zone to be uniform.

This is because, at the nozzle exit, all the precursor particles do not have the same velocity. The precursor particles on the periphery, i.e. closest to the walls of the nozzle, are slowed down compared with the particles lying at the center of the flow. Thus, by injecting the confinement gas concentrically around the mixture, the precursor particles on the periphery are accelerated by an entrainment effect.

Thus, the precursor particles have a uniform rate of transit and this results in a uniform transit time, consequently giving a better size distribution of the nanocrystals.

If the flow rate of the mixture entering the reaction chamber is modified without consequently modifying the flow rate of the incoming confinement gas, the size distribution of the nanocrystals deteriorates.

Thus, when the flow rate of the incoming mixture is modified, the flow rate of the confinement gas is consequently also modified. For example, a constant ratio between these two flow rates is maintained.

As will have been understood, the reaction zone lies on the path of the stream of the gas mixture. The precursor particles therefore travel a certain path before entering this zone. Thus, this path may have an influence on the size of the nanocrystals. For example, the precursor particles have a lower velocity than the velocity at the nozzle exit. Thus, the further the reaction zone from the nozzle exit, the larger the size of the nanocrystals obtained may be.

This distance must therefore be taken into account, for example by controlling the line of sight of the focusing device or of the laser.

To guarantee good pyrolysis quality, measures are taken to ensure that a flat flame is obtained for low production rates, and a flame which is elongate, broad and symmetrical for high production rates. In both cases, these flames ensure good pyrolysis.

More generally, measures are taken to ensure that a homogeneous flame is maintained, that is to say one with an approximately constant luminosity. Good flame homogeneity ensures that the precursor particles all receive the same power from the laser source. This ensures that there is a proper size distribution of the nanocrystals produced.

Provision may be made to control the pressure in a feed pipe for the mixture introduced into the reaction chamber. This control may be relative to a pressure in the mixture at a predetermined distance from the reaction zone, for example a distance of thirty centimeters. This control may also be relative to the pressure in the mixture feed pipe (nozzle).

The pressure in the reaction chamber may also be controlled, or the flow rate of the mixture in the reaction zone may be controlled.

The pressure may be adjusted within quite a wide range; it may be lowered down to below 150 torr or even below 50 torr. However, measures are taken to ensure that a steady, i.e. relatively constant, pressure is maintained during a production sequence so as to guarantee a narrow size distribution of the nanocrystals.

Another parameter which it is advantageous to manage, in order to control the size of the nanocrystals, is the ratio of the effective pulse duration to the laser firing period. An advantageous range for implementing this control is between about 0.2 and 0.4.

Finally, it is advantageous, for achieving high production rates, to control the power of the laser radiation.

Within a nanocrystal size range extending from 3 to 4 nm, the production rates obtained may range up to 80 mg/h, or even up to 200 mg/h, particularly advantageously in an embodiment described later.

Of course, these production rates take the size of the nanocrystals into account. For example for 10 nm nanocrystals, a satisfactory production rate is around 1000 mg/h.

In embodiments of the invention, the extent of the zone in which the pyrolysis reaction takes place is controlled. More precisely, the dimensions of the laser spot are controlled, in particular the spatial distribution of the light power transferred to the mixture introduced into the reaction chamber. The laser spot is observed in a plane orthogonal to the mean direction of the light rays coming from the laser source or, as the case may be, from the focusing device. A good result for the dimensions of this spot in the plane orthogonal to the mean direction of the light rays, when the direction of the flow is parallel to the plane of observation of the spot, is for example 0.5 mm in the flow direction of the mixture introduced into the reaction chamber and 3 mm in a direction orthogonal to the flow direction.

It is advantageous to ensure that the width of the flow, i.e. the dimension of the flow in a direction orthogonal to the flow direction, is covered. Thus, all the precursor particles of the mixture interact with the laser beam. By matching the spot to the width of the flow it is possible to avoid too narrow a laser spot, which would let precursor molecules from the edges of the stream pass through the reaction chamber without undergoing pyrolysis. In this way, it is also possible to avoid too extended a spot, which would illuminate a zone not containing any precursor particles and would therefore result in an unnecessary loss of surface energy.

The other dimension of the spot may be its height, i.e. its dimension along the flow axis. This dimension may have an effect on the size of the particles. Specifically, the more extended the spot along this dimension, the more the precursor particles will interact with the laser in the reaction chamber. Thus, to obtain quite fine nanocrystals, too large an extension of the spot along the flow direction is to be avoided.

Ideally, the shape of the spot is rectangular. Specifically, it is preferable to obtain uniform illumination on the stream so as to prevent particles, depending on their position in the stream relatively close to the periphery, from not travelling the same distance in the zone of interaction with the laser, and therefore interacting to a greater or lesser extent with the beam, which would have an impact on the size distribution of the nanocrystals.

To summarize, a spot having the same width as the mixture flow is produced, while taking measures to ensure that a constant height is maintained. In this way, the production rate is increased while still maintaining a fine and equidistributed size of the nanocrystals.

Figure 7A:
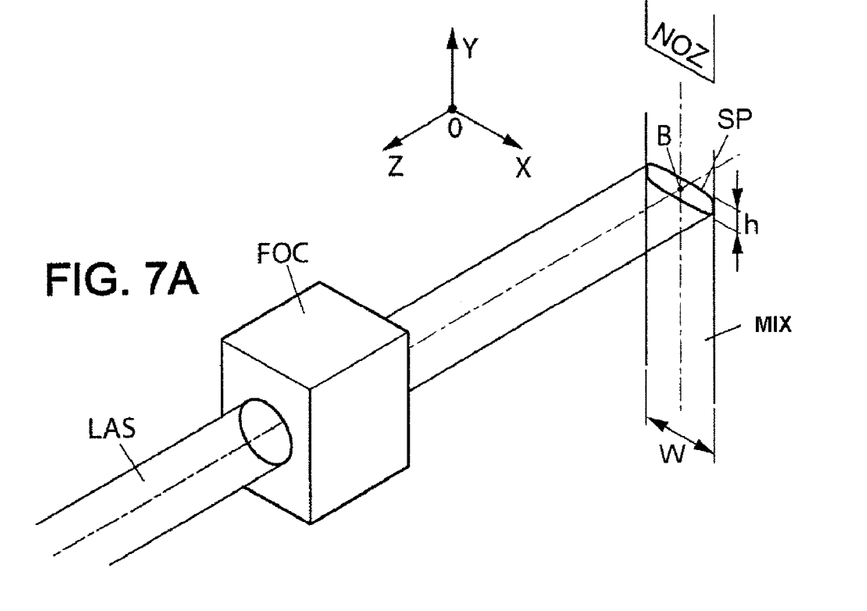
FIG. 7A illustrates a focusing device for controlling the laser spot.

To control the dimensions of the spot, an adjustable focusing device FOC shown in FIG. 7A may be used. Referring to this figure and to the orthonormal reference frame (O,x,y,z) of this figure, laser light LAS coming from a source (not shown) is directed along an axis (Bz) in the direction of the flow MIX. This flow is output by a nozzle NOZ and is cylindrical, directed along the (By) axis. The point B is one point in the flow. The spot SP is observed in the (B,x,y) plane.

The focusing device enables the dimensions of the spot to be adjusted in the direction parallel to (Bx) as regards the width and parallel to (By) as regards the height. This adjustment may be independent for each of the directions.

Thus, the device is adjusted so that the width W of the spot corresponds to that of the flow MIX. As will be understood, the width of the flow corresponds in this example to the diameter of the flow at the mean point of interaction with the laser.

The device is also adjusted so that the height h of the spot is approximately constant.

In general, the device is adjusted so as to have a height of around 0.5 mm. Of course, a person skilled in the art will ensure that this adjustment takes into account the problems due to the diffraction and aberrations of the light rays coming from the laser source that may occur. These problems are inherent in optical devices and a person skilled in the art can correct them.

Of course, depending on the focusing device used, the spot may have various (square, rectangular, circular, elliptical or other) shapes.

For example, the focusing device may comprise one or more cylindrical or semicylindrical lenses. Such lenses make it possible to focus incident light along a straight line segment, in a manner known per se.

Figure 7B:
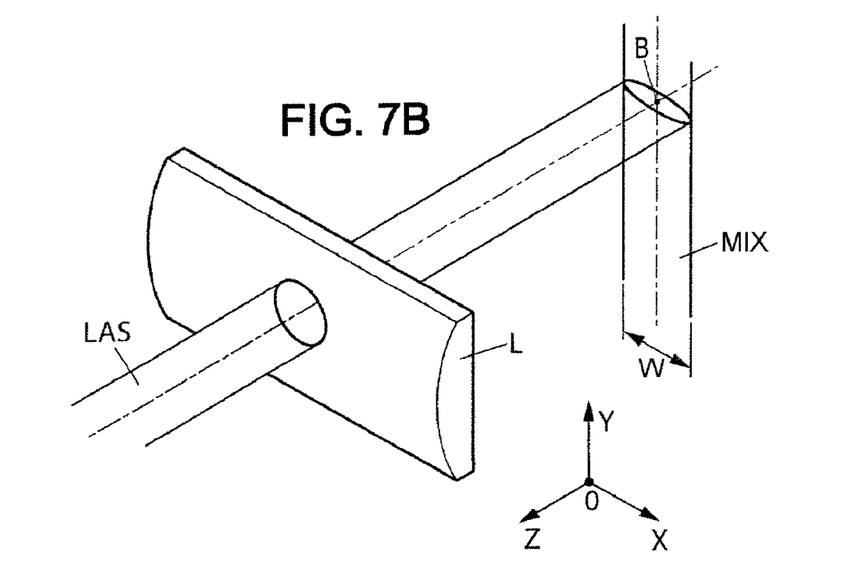
FIG. 7B illustrates a focusing device comprising a cylindrical lens.

One example of such a device comprising a single lens is shown in FIG. 7B with the same notations as in FIG. 7A. In this FIG. 7B, a semicylindrical lens L has its axis of invariance directed orthogonally to the flow direction of the mixture MIX. The term "direction of invariance" is understood to mean the direction along which the lens does not modify the incident light. For a lens shaped as a portion of a cylinder of revolution, this axis corresponds to the axis of revolution of the cylinder.

Thus, by controlling the distance from the focal plane of this lens relative to the reaction zone, the width of the spot is adjusted. For example, a lens with a focal length of 500 mm is used to obtain an approximately oblong spot with a long dimension along the (Bx) axis, possibly extending as far as the width of the stream of reactive mixture, for example 3 mm.

Figure 7C:
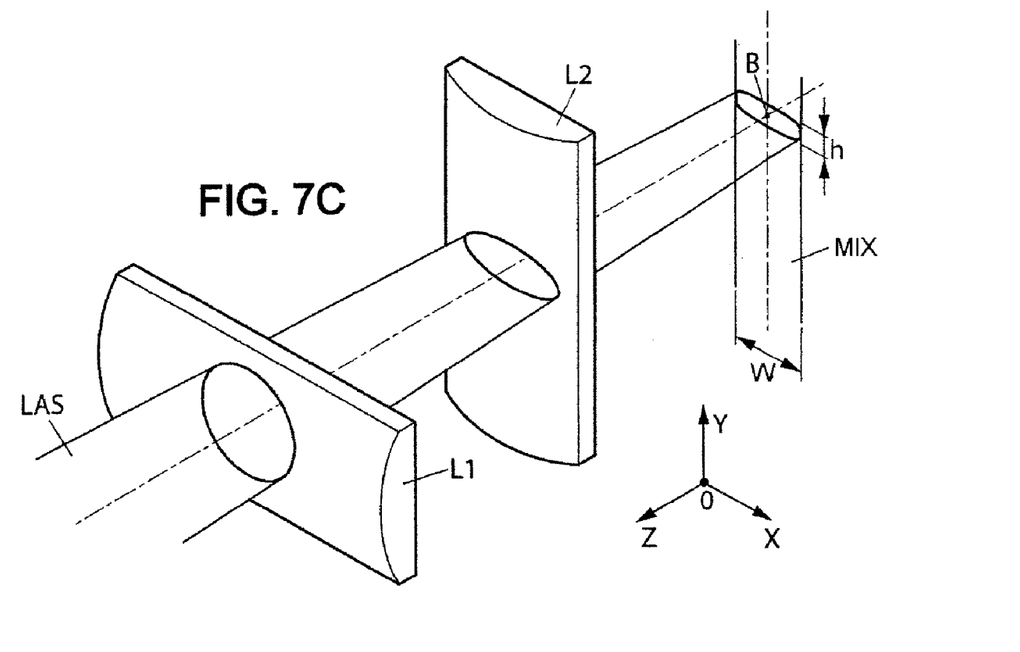
FIG. 7C illustrates a focusing device comprising two lenses.

A focusing device comprising two cylindrical lenses may be envisaged, such as that illustrated in FIG. 7C with the same notations as in FIG. 7A. In this case, measures are taken to ensure that the directions of invariance of each of the lenses L1 and L2 are different. The expression "different directions" is understood to mean directions defined by vectors, for example in an orthonormal plane, which are non-collinear.

Here, the axes of invariance of the lenses are orthogonal and the axis of invariance of the lens L2 is parallel to the flow direction of the mixture.

In this way, a spot having at least two characteristic magnitudes is obtained. By independently varying the distances of each of the lenses from the reaction zone, it is possible to adjust each of the two characteristic magnitudes.

For example, in the device shown in FIG. 7C, the laser produces a circular spot in a plane orthogonal to the mean direction of the light rays that emanate therefrom. After passing through the lens L1, this spot has the shape of an ellipse. The major axis of the ellipse is parallel to the (Bx) axis, since the axis of invariance of L1 is also parallel to this axis. After the light rays have passed through the lens L2, the ellipse has been deformed along an axis parallel to (By), since the axis of invariance of the lens L2 is also parallel to this axis.

Thus, level with the flow of the mixture, in the (B,x,y) plane, a spot with the characteristic dimensions W and h is obtained, said characteristics being measured in a direction orthogonal to the flow direction and parallel to the flow direction of the mixture, respectively. The spot is basically rectangular, but with sides approximately in the form of elliptical arcs ("cushion" overall shape); in this case, the characteristic magnitudes are the length and the width of the rectangle, these being measured along a direction orthogonal to the flow direction and parallel to the flow direction of the mixture, respectively.

It will therefore be understood that, for example, by providing the lens L1 it is possible in particular to vary the production rate and by providing the lens L2 it is possible in particular to vary the size of the nanocrystals, and to do so independently.

For example, L1 and L2 are cylindrical and have the same focal length f. The distance between L1 and the (By) axis is set to f. The distance between L2 and the axis of the nozzle can be adjusted and enables the width W of the laser spot to be adjusted. The height h of the spot is given, for example, by the diffraction limit (0.45 mm at 10.6 µm with a 500 mm focal length). Satisfactory overlap between the gas stream and the laser is therefore obtained.

By controlling the dimensions of the spot it is possible, for example, to adapt the illumination area to the thickness of the flow of mixture introduced into the reaction chamber, i.e. the dimension of the flow in a plane orthogonal to the mean direction of the rays coming from the focusing device and orthogonal to the flow direction. Thus, a maximum light power density is transferred to the mixture, while minimizing losses.

To avoid edge effects and to guarantee good size distribution of the nanocrystals, measures will be taken to ensure that the width W is not too large. This is because, on the periphery of the flow, i.e. close to the flow of the confinement gas, as already mentioned above, the precursor molecules do not at all have the same velocity as those closer to the mean flow axis.

This advantageous geometry of the interaction zone is therefore obtained by modifying the focusing parameters, thereby improving the production rate of nanocrystals while reducing their size.

This result has been obtained by employing laser focusing means which use one or two cylindrical lenses, and in which, in the case of two lenses, the focal planes are crossed so as to adjust the vertical and horizontal dimensions of the spot in the reaction zone independently, by therefore varying the distance of each lens from the reaction zone. The best result has been obtained for a spot 0.5 mm in height and 3 mm in width (measured experimentally) for the reactive mixture stream feed conditions described above.

The production rate was thus able to go from 80 mg/h for nanocrystals 4 nm in diameter to more than 200 mg/h for nanocrystals in the 3-4 nm range.

Figure 8:
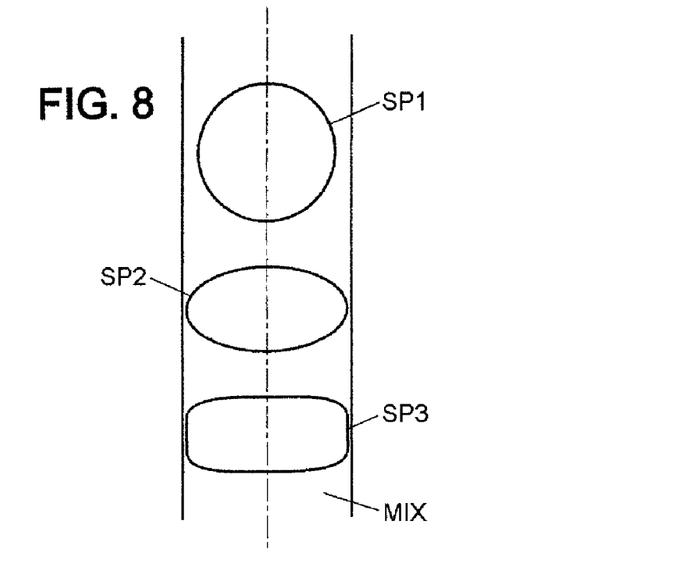
FIG. 8 illustrates various shapes of spots for the same mixture flow.

FIG. 8 illustrates various spot shapes for the same flow. This figure makes it possible to compare the effects of spot shape on the production performance. The first spot SP1 is circular, but does not cover the lateral edges of the reactive stream. Thus, with a stream wider than this diameter, an optimum production rate is not obtained since mixture precursor particles pass on either side of the spot.

The spot SP2 is elliptical and may be obtained, for example, by deformation of a circular spot using a semicylindrical lens L1 (FIG. 7B). Thus, for a given height (along the flow direction of the mixture), it is possible to cover the entire width of the flow (along a direction orthogonal to that of the flow). In this way, the production rate is increased.

The spot SP3 is rectangular and may for example be obtained by deformation of the elliptical spot SP2, by adding a second semicylindrical lens L2, as described above with reference to FIG. 7C. Thus, the spot has an approximately constant height and the particles pass through the reaction zone interacting approximately in the same manner with the beam, thereby improving the size distribution of the nanocrystals.

The invention claimed is:

1. A method for synthesizing silicon-containing nanoparticles by laser pyrolysis, comprising the steps of:
conveying, by a carrier fluid, a precursor containing silicon to a pyrolysis reactor;
applying laser radiation in the reactor to the carrier fluid and the precursor;
recovering silicon-containing nanoparticles at an outlet of the reactor;
controlling at least a power of the laser radiation and a pulse duration within a laser firing period of the radiation, wherein the pulse duration ranges from about 40% to 75% of the laser firing period;
controlling a rate of transit of the carrier fluid through the reactor wherein the rate of transit of the carrier fluid ranges from about 4 to about 11 meters per second; and
controlling a dilution of the precursor in the carrier fluid wherein, since the precursor contains one silicon atom per molecule, the dilution of the precursor in the carrier fluid is between $1/25$ and $1/10$.

2. The method as claimed in claim 1, wherein the laser power is about 500 watts or higher.

3. The method as claimed in claim 1, wherein the effective pulse duration is between about 30 microseconds and about 260 microseconds.

4. The method as claimed in claim 1, wherein the power of the laser radiation is between about 500 watts and about 2400 watts.

5. The method as claimed in claim 1, further comprising focusing the laser radiation onto a spot of a few millimeters in diameter in the reactor.

6. The method as claimed in claim 5, further comprising focusing the laser radiation in order to adjust the height and/or width dimensions of the spot.

7. The method as claimed in claim 1, wherein the carrier fluid, at least, is in gaseous form in the reactor and wherein it further comprises controlling a pressure of the carrier fluid, at least, in order to operate at low pressure in the reactor.

8. The method as claimed in claim 7, wherein the carrier fluid is an inert gas.

9. The method as claimed in of claim 7 wherein the pressure of the mixture containing the carrier fluid and the precursor in the reactor is controlled so that it is between about 40 torr and about 300 torr.

10. The method as claimed in claim 1, wherein the precursor is silane in gaseous form.

11. The method as claimed in claim 1, further comprising quenching the nanoparticles by applying a cold gas after the pyrolysis.

12. The method as claimed in claim 1, further comprising controlling a laser firing frequency of the laser radiation.

* * * * *